April 11, 1944. E. A. WILLE 2,346,631
CONTAINER COVER
Filed Aug. 12, 1941
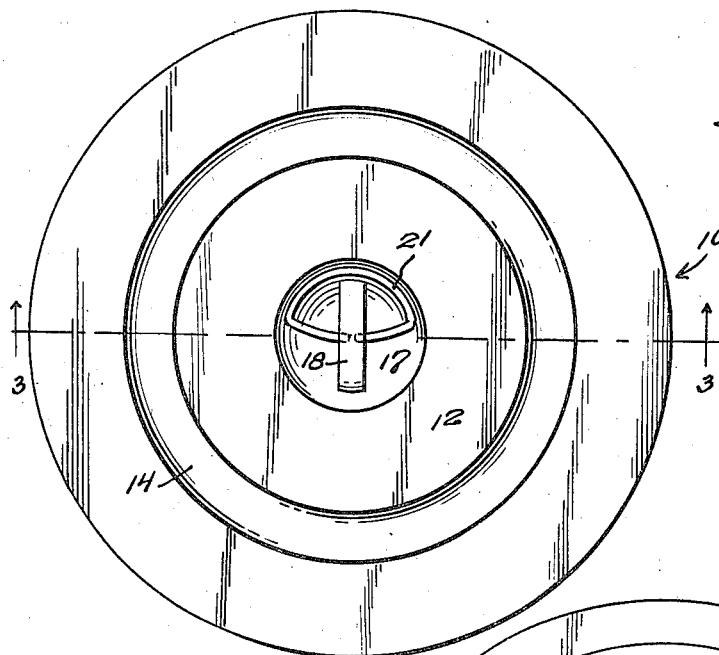
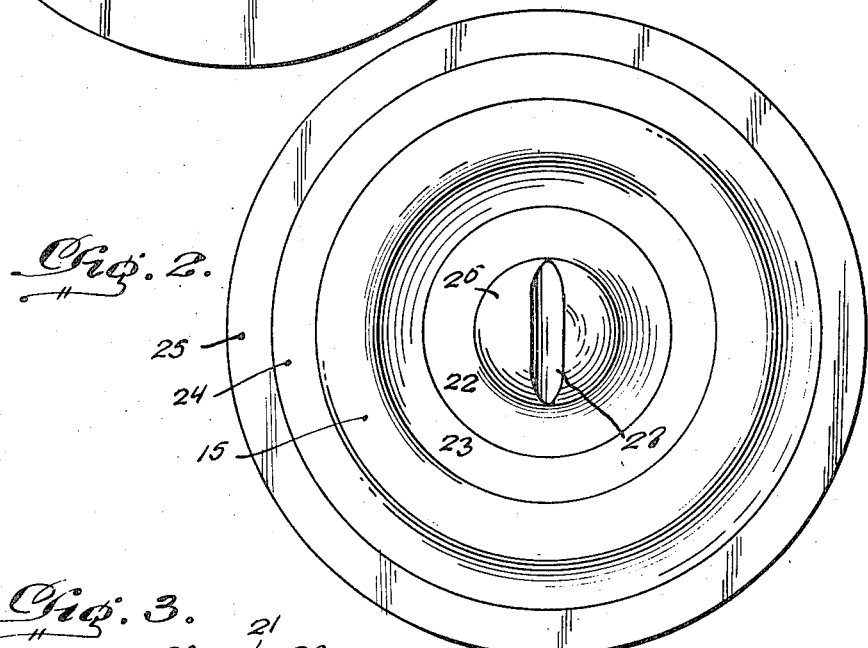
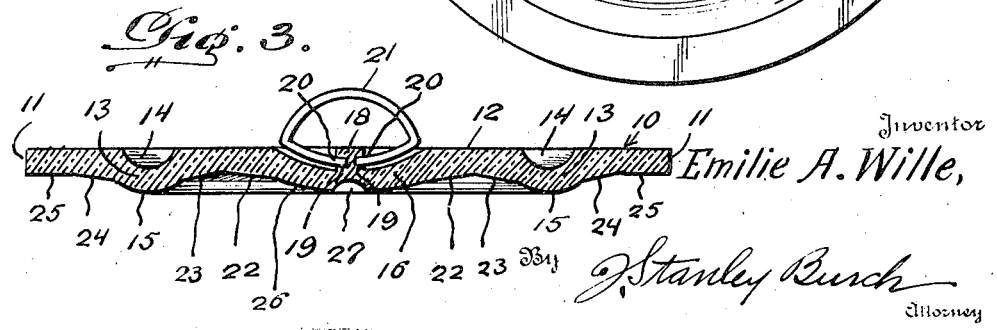
Inventor
Emilie A. Wille,
Stanley Burch
Attorney Patented Apr. 11, 1944

2,346,631

UNITED STATES PATENT OFFICE 2,346,631

CONTAINER COVER

Emilie A. Wille, Mount Prospect, Ill.

Application August 12, 1941, Serial No. 406,547

7 Claims. (Cl. 99—347)

This invention relates to covers for smooth rimmed containers to prevent moisture from escaping and drying out food or any other substance, as well as to keep foods fresh and sanitary.

An object of the invention is to provide a cover preferably of a transparency such as pressed or molded plastic or ovenproof glass and in any shape desired such as round, oval, square or other rectangular shapes, all following the same novel construction, in graduating sizes.

Another object of the invention is to provide a novel cover which is not only relatively flat, but which permit nesting or one cover to be placed upon another to save space, and of such shape as to induce vapors to drip as well as to keep the covers from slipping off of a container but to remain securely in place and keep foods fresh and sanitary as well as to provide for convenient lifting without interfering with the nesting of the covers.

The device is also adapted to cover various receptacles to prevent the contents from drying out or becoming contaminated and yet enable one to see what is in the container at a glance and without removing the cover. It may also be made of ovenproof glass for covering sauce pans, skillets kettles and baking dishes either on the stove or off, thereby enabling the housewife to use any cooking utensil or vessel on hand for waterless cooking, as the formation of the cover will prevent steam from escaping when fire is turned down low. In addition, pans or fresheners in refrigerators as well as vegetable hydrators may be fit with large oblong covers and enable the owner to see what she has on hand without lifting out or uncovering the same, thus avoiding exposure and saving time as well as electricity.

Other objects and advantages will be apparent as the description proceeds and in connection with the accompanying drawing, in which:

Figure 1 is a top plan view of one form of cover,

Figure 2 is a bottom plan view thereof; and

Figure 3 is a diametrical sectional view taken on line 3—3 of Figure 1.

Referring to the drawing in detail, in which for example a round cover is shown, the same comprises a preferably transparent relatively flat body 10 of a pressed or molded plastic or glass, which may be oven proof, but may be round, oval, square or rectangular shape, and of graduating sizes to fit various smooth rim containers or vessels. The edge 11 is preferably straight and the top face 12 relatively flat and normal to the surrounding or peripheral edge 11, except for a depressed portion or ring 13 equidistantly spaced from the surrounding edge or concentric thereto and forming a similarly related top depression or groove 14 and a bottom rib 15 adapted not only to produce strength but induce vapors to drip from the underside or bottom face as well as keep the cover from slipping off a container. This is also assisted by the weight of the cover, so as to keep the cover on and securely in place thereby keeping foods fresh and sanitary. Of course, the cover will be made in various shapes and sizes to fit practically any container or vessel irrespective of the size and use thereof.

For convenience in lifting the cover, the latter is provided with a central depression 16 forming a top recess 17 across which is provided a diametrical rib 18 having opposed central sockets 19 adapted to receive the inturned ends 20 of a wire or like metal ring handle or bow bail 21. This handle is adapted to seat in the concaved recess 17 and thereby permit the covers to be nested flat or placed one upon another to save space in packing or stacking for storage or shipment.

An important feature of the cover formation is the bottom face so as to fit the rims of various sized and types of containers, each cover preferably varying in size and adapted to fit containers that vary in size within 1½ inches. As shown, the portion adjacent the central depression 16 is inclined in opposite directions as at 22 and 23, the inner seat portion 22 sloping inwardly and downwardly to drain toward the center and cause vapors to drip therefrom. The outer seat portion 23 which meets the portion 22 at an obtuse angle, slopes outwardly and drains toward the rib 15 and causes vapors to drip therefrom into the container. The seat portion 24 outwardly of the rib 15 slopes inwardly toward the rib and drain moisture inwardly to drip therefrom. The outer seat portion 25 is flat or substantially parallel to the top face, but preferably slopes inwardly slightly to drain inwardly, and all of these angular or inclined portions as well as the rib are preferably ½ inch wide so as to fit various sized containers with said portions engaging the rims thereof and accommodating several of different sizes. Of course, the shape of the cover will be in accordance with the shape of the container or vessel and in each instance form a tight fit and seal the engagement with the rim thereof.

The bottom central depression 16 forms a convex projection 26 corresponding in shape to the shape of the cover but preferably provided with a diametrical or straight groove 27 in alignment with and beneath the rib 18 to prevent undue weight without sacrificing strength to any noticeable degree and also provide for draining of of moisture or vapors from the semicircular or rectangular portions thus provided on either side thereof and especially at the inner edges thereof.

For instance, small 3 inch size made of ordinary glass or transparent plastic or earthenware will cover milk bottles, opened fruit jars, cups, glasses, etc. The next size 3¾ inch, will cover custard cups, small dishes for left overs, individual prepared desserts such as sherbets, molds, etc. In proper sizes, the cover can also be used for covering water glasses at bedside tables, medicine glasses, sterilized first aid bandages, spatulas, etc., in hospitals, beauty and barber shops, restaurants, food stores, etc., or all containers that contain anything that might become dried out or contaminated if left open, and yet enable the owner to see what is in them at a glance.

Large covers from 6 inches up, to be made of pressed or molded plastic or ovenproof glass can be used for covering sauce pans, skillets or frying pans, kettles and baking dishes either on the stove or off. This will enable the housewife to use any cooking utensil on hand for waterless cooking as the weight of the cover and the formation of the underside or bottom face will properly seal the joint at the rim of a smooth rom container or vessel and prevent steam or vapor from escaping when the fire is turned down low. Of course, the fireproof or ovenproof glass may be used in the covers of any size as before stated, the cover can be made in various shapes as well as sizes, and thus, large oblong covers will be made to fit the vegetable hydrators, pans or freshners in refrigerators, thus enabling the owner to see what she has on hand without lifting out and uncovering, thus saving time and electricity.

From the foregoing description, it will be seen that the invention can be made in various styles, sizes and shapes and is very simple while permitting each size to accommodate itself to several containers of different sizes. It will also be apparent that various changes may be made in the shape, size, arrangement and proportions of the parts without departing from the spirit of the invention as defined by the scope of the appended claims.

It will also be seen that the device will well replace and prove much more satisfactory and sanitary than the flexible covers sometimes used for receptacles and which cannot be kept clean and sanitary because food and foreign matter lodges in the folds where gathered and to the elastic strips, tapes or bands sewed thereto, so as to become rancid, poisonous, contaminating and of bad odor, as well as injurious to one's health.

I claim:

1. A cover of the class described for smooth rim containers consisting of a relatively flat body having a substantially central depending convex depressed portion at the bottom and a surrounding bottom recess inclined in opposite directions at obtuse angles to each other substantially from the transverse center thereof to form inner and outer seats to fit the rims of different sized containers at any point in their widths, a depressed portion surrounding said outer seat with a bottom rib, a seat surrounding said rib and inclined inwardly at an obtuse angle toward the same to fit the rims of different sized containers at any point in its width, and a surrounding outer horizontal flat seat portion above and outwardly of the last-named seat and parallel to the normal top face of the body to fit the rims of different sized containers at any point in its width, the inner seat serving to drain vapor and moisture toward the central depressed portion to drip therefrom into the container and the outer inclined portions serving to drain vapor and moisture toward the rib to also drip therefrom into the container.

2. A cover for various containers of the class described consisting of a transparent fireproof substantially flat body having a central depressed bottom portion with a top recess conforming thereto and a bottom rectilinear recess therein, an annular recess in the bottom face of the body outwardly of and concentric to the central depressed portion and having flat annular seats sloping at acute angles to the plane of the flat body in opposite directions inwardly and outwardly each to fit the rims of different sized containers across the widths thereof, an annular depressed bottom portion outwardly of and concentric to said annular bottom recess, with an annular concentric top groove above the same and an annular concentric bottom rib beneath the groove and substantially conforming in cross sectional curvature thereto, an annular concentric inwardly inclined flat seat also at acute angles to the plane of the flat body immediately outwardly of and sloping toward the rib, to fit the rims of larger containers of different sizes across the width thereof and an outer annular concentric horizontal flat seat immediately outwardly of the top of the latter sloping seat and substantially parallel to the normal flat top face of the body, said sloping seats serving to drain moisture toward the central depressed portion and bottom rib to drip therefrom into the container.

3. A cover for smooth rimmed containers for the purposes described comprising a circular relatively flat fireproof transparent glass body having a normally flat top surface having a central circular top recess having a diametrical rectilinear rib across the same with opposed central sockets on opposite sides, and a bowed handle having inturned ends pivoted in the sockets to permit the handle drop into the recess whereby the covers can be nested flat on one another or the handle raised to lift the cover, said body having a rectilinear groove in the bottom of the cover beneath said rib.

4. A cover for smooth rimmed containers for the purposes described comprising a circular flat fireproof transparent glass body having a flat top face with a central circular recess with a diametrical rib therein even with the top face, and a circular depressed part beneath the recess depending below the bottom face of the rim and normal thickness of the body having a diametrical bottom groove parallel with and beneath the rib, said depressed part sloping inwardly around the outside at acute angles to the plane of the body, an oppositely sloping annular recess in the bottom of the body outwardly of the depressed part forming oppositely sloping inner and outer rim engaging seats also at acute angles to the plane of the body and adapted to drain condensed vapors inwardly and outwardly in opposite directions away from each other, an annular depressed bottom rib outwardly of said recess and toward which said outer seat drains, an annular recess in the top face of the body above the annular bottom rib, an annular inwardly sloping seat around the bottom rib also at acute angles to the plane of the body and an annular substantially horizontal flat surface on the bottom of the body outwardly of and above the last-named seat.

5. A cover for containers or vessels of the class described, consisting of a transparent substantially flat body having a central depending convex portion sloping upwardly on the outside, a plurality of narrow successively oppositely sloping rim engaging portions on the bottom conforming in shape to the perimetrical shape of the body at obtuse angles to each other and at acute angles to the plane of the body, and a handle at the center of the top adapted to seat in a depression therein below the top face thereof and receive the center of a body thereover, whereby the covers may be nested one on the other.

6. A cover for containers or vessels of the class described, consisting of a transparent substantially flat body having a central depending oppositely sloping portion and a plurality of surrounding narrow concentric successively oppositely sloping annular bottom face portions at acute angles to the plane of the flat body and at obtuse angles to each other to fit the rims of various sized containers or vessels at any point transversely thereof, and ribs below said portions depending from the bottom face of said body to drain moisture from the cover inside the container or vessel, the outer portion of said body being relatively flat and horizontal, and merging with the top of the adjacent inwardly sloping annular portion.

7. A cover for various vessels, comprising a relatively flat transparent body having a flat top face provided with a central depression and an intermediate surrounding depression, and also having a depending bottom rib coincident with said intermediate depression, the central depression adapted to receive a bail to lie therein below said top face when not in use, the bottom face of the body having a projection below said central depression, and a series of oppositely sloping flat concentric portions at acute angles to the plane of the body conforming to the slope of the body and arranged for draining moisture toward said projection and rib on opposite sides thereof.

EMILIE A. WILLE.